United States Patent [19]

McCoy

[11] 4,434,850
[45] Mar. 6, 1984

[54] METHOD FOR DEMULSIFICATION OF BITUMEN EMULSIONS USING POLYALKYLENE POLYAMINE SALTS

[75] Inventor: David R. McCoy, Austin, Tex.

[73] Assignee: Texaco Inc., White Plains, N.Y.

[21] Appl. No.: 326,456

[22] Filed: Dec. 2, 1981

[51] Int. Cl.³ .................... C10G 33/04; E21B 43/24; E21B 43/40
[52] U.S. Cl. .................... 166/267; 166/303; 208/188; 210/708; 252/344
[58] Field of Search ............ 252/331, 341, 344, 358; 208/188, 11 LE, 11 R; 210/708; 166/266, 267, 272, 303

[56] References Cited

U.S. PATENT DOCUMENTS

| | | | |
|---|---|---|---|
| Re. 29,908 | 2/1979 | Fowler | 210/708 |
| 3,108,059 | 10/1963 | Greenwald | 210/708 X |
| 3,267,998 | 8/1966 | Simpson | 208/11 LE X |
| 3,344,083 | 9/1967 | Dickson et al. | 252/344 |
| 3,637,521 | 1/1972 | Tsuk | 252/326 |
| 3,855,299 | 12/1974 | Witt | 210/708 X |
| 4,308,149 | 12/1981 | Selvarajan | 210/708 X |

FOREIGN PATENT DOCUMENTS 48-44336 12/1973 Japan ................. 210/708

OTHER PUBLICATIONS

Chemical Abstracts, vol. 53, 1959, Abstract No. 6592g, Wolf et al., "Breaking of Oil-in-Water Emulsions,".
Chemical Abstracts, vol. 73, 1970, p. 127, Abstract No. 5714c, Bazhenov et al., "Dehydration and Desalting of Petroleum,".

Primary Examiner—George A. Suchfield
Attorney, Agent, or Firm—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are polyamine salts prepared by contacting poly(ethyleneimines) with organic or inorganic acids. The polyamines have a molecular weight of at least 1,000. To resolve the bituminous petroleum emulsions, the process is carried out between 25° and 160° C. wherein the demulsifier of the invention is contacted with the bituminous emulsion.

4 Claims, No Drawings

METHOD FOR DEMULSIFICATION OF BITUMEN EMULSIONS USING POLYALKYLENE POLYAMINE SALTS

BACKRGROUND OF THE INVENTION

1. Field of the Invention

This invention is concerned with the breaking or resolution of oil-in-water (O/W) bituminous emulsions by treatment with polyamine salts.

2. Description of Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The following is a list of several art references.

A. C. W. W. Gewers, *J. Canad. Petrol Tech.*, 7(2), 85–90 (1968).

B. U.S. Pat. No. 4,058,453 describes the use of high molecular weight ($\geq 1$ million) poly(ethylene oxides) for breaking bitumen-in-water emulsions.

C. Chem. Abstr. 89 79694 describes the dewatering of mineral slimes using poly(ethyleneimines) (PEI).

D. Co-pending application, Ser. No. 326,455, filed Dec. 2, 1981, contains much of the prior art on emulsion breaking using miscellaneous cationic polymers and the effect of pH on bitumen emulsions.

E. U.S. Pat. No. 3,344,083—Emulsions broken by reaction products of poly(ethyleneimines) with ketones, fatty acids, or alkylene oxides. PEI's or PEI salts are not mentioned, however.

F. U.S. Pat. Nos. 3,445,441; 3,509,047; and 3,528,928 claim the use of polyamine co-polymers with (meth)acrylate esters for breaking O/W emulsions.

G. U.S. Pat. No. 3,409,546—Raw sewage sludge is dewatered using a mixture of polyamines and vinyl-addition polymers.

H. U.S. Pat. No. 2,995,512—Water soluble salts of PEI's were used to flocculate solids from an aqueous liquid.

I. Chem. Abstr. 73 5714c (USSR Patent 263,794)—Petroleum emulsions dehydrated and desalted using PEI.

J. Chem. Abstr. 80 85486n (Ger. Pat. 2,227,546)—Ethylene oxide/propylene oxide adducts of PEI used to break petroleum emulsions containing 22–45% $H_2O$.

K. Chem. Abstr. 82 115844p Sludges dewatered by addition of (a) PEI, and (b) enough $H_2SO_4$ to make pH 3.

L. Chem. Abstr. 89 79694Y—Mineral slimes flocculated using polymers such as PEI's.

M. U.S. Pat. No. 2,243,329—W/O emulsions broken using acylated polyalkylene polyamines.

N. U.S. Pat. No. 2,589,198—O/W emulsion broken using reaction products of fatty acids with polyalkylene polyamines.

O. Chem. Abstr. 53 6592—PEI slightly crosslinked with epichlorohydrin breaks O/W emulsions.

P. U.S. Pat. No. 4,057,580 describes the preparation of polyamine condensate polymers from $NH_3$ and $ClCH_2CH_2Cl$.

SUMMARY OF THE INVENTION

The invention is a method for recovering petroleum from O/W bitumen emulsions by resolving or breaking these emulsions by contacting the emulsions at a temperature of from between about 25° and 160° C. with water soluble polyamine salts prepared by contacting polyamines with organic or inorganic acids. The polyamines having a molecular weight of at least 1,000 and ranging up to the limits of water solubility.

The invention is also a process whereby the aqueous phase of the broken bitumen emulsions is adjusted in pH in order to deactivate the demulsifier so that the water may be used in subsequent in situ hot water or steam floods of the tar sand formation.

DESCRIPTION OF THE PREFERRED EMBODIMENTS

Especially useful and preferred in this process are water soluble polyamine salts prepared by contacting polyamines with organic or inorganic acids. The polyamines must have a molecular weight of at least 1,000, and preferably greater than 10,000, with the upper molecular weight limit only fixed by the limits of water solubility. Especially preferred in this invention are the water soluble polyamine salts which comprise the poly(ethyleneimines) prepared by polymerization of aziridine followed by optional slight crosslinking with epichlorohydrin, dichloroethane and similar materials to raise the molecular weight to the desired amount.

The acids used are mono-, di- or polybasic and can be inorganic mineral acids such as HCl, $H_2SO_4$, $H_3PO_4$ or acidic salts such as $NaHSO_4$, $Na_2HPO_4$ and similar materials or low molecular weight carboxylic acids such as acetic acid. Enough acid should be added to the amine to render a 1% aqueous solution pH of less than about 8.

A separate embodiment of this invention is a process for recovering bitumen from a tar sand formation comprising injecting into the tar sand a fluid containing hot water and/or steam in order to emulsify the bitumen in the tar sand, recovering the emulsified bitumen, demulsifying said emulsion by adding thereto demulsifiers comprising polyamine salts prepared by contacting polyamines with organic or inorganic acids having a molecular weight of at least 1,000. After this demulsification process has taken place, this embodiment of the invention includes converting the salts of the polyamine polymers into inactive polymers by pH adjustment of the aqueous phase of the broken emulsion and then reinjecting the aqueous phase into a bitumen containing formation to recover additional bitumen. This pH adjustment may in some cases take place naturally depending on the pH of the recovered emulsion. In these cases pH adjustment will not be necessary.

Although the use of poly(ethyleneimine) and its salts as flocculants is common in the literature (prior art references C, G, H, K and L) as in the use of various chemical derivatives of poly(ethyleneimines) as demulsifiers (prior art references E, F, J, M and N), the use of poly(ethyleneimine) salts to break tar sand bitumen emulsions is believed to be novel. The closest references seem to be I, where "petroleum emulsions" are broken by poly(ethyleneimine) itself and reference O where O/W emulsions are broken by poly(ethyleneimines) "slightly crosslinked" with epichlorohydrin. Neither reference teaches that it is crucial to add the poly(ethyleneimine) as its water soluble salt. It is also unexpected that the simple poly(ethyleneimine) salts are actually superior to quaternary ammonium salts derived from poly(ethyleneimine) and superior to other polycationic polymers such as salts of poly(2-vinylpyridine) and poly(vinylamine). The specificity of order used in contacting the three pertinent elements: polyamine, acid and emulsion is also unexpected.

The produced bitumen emulsions may be treated by the process of our invention in a conventional manner, for example, in a conventional horizontal treater operated, for example, from about 25° to 160° C. and, preferably, from about 50°–150° C. at autogenous pressures. The concentration of the chemical demulsifier described above used in treating the bitumen in water emulsions may range from about 1 to 200 parts per million and, preferably, from about 10 to 100 parts per million with the optical addition of an organic diluent and/or inorganic salt as well as standard flocculants and mechanical or electrical means of demulsification. The following examples describe more fully the present process. However, these examples are given for illustration and are not intended to limit the invention.

DEMULSIFIER TESTING OF PRODUCTS

The general method employed in testing the products of the examples is as follows:

(a) A 1 wt.% solution of each chemical was prepared in water with pH adjustment by use of concentrated hydrochloric acid.

(b) A 30 ml PYREX ® test tube equipped with screw top was charged with 23 ml emulsion of 11.5 wt.% bitumen content obtained by in situ steam flooding in tar sand pattern located at Ft. McMurray, Alberta, Canada.

(c) 2 ml Wizard Lake crude oil was added as diluent and the contents of the test tube were mixed.

(d) The contents of the test tube were equilibrated in a 80° C. oven for 1–2 hours and mixed again.

(e) Chemical was added to the hot, dilute emulsion at the following concentrations: 60, 120, 180 ppm.

(f) Contents of the test tubes were mixed, reequilibrated in an oven at 80° C. for 1 hour and mixed again.

(g) After 20 hours of standing at 80° C., measurements were made on the volume of top and middle layers, and the appearance of the aqueous phase was noted. Samples of some top layers were carefully removed by pipetting and subjected to Karl Fischer analysis for determination of the water content.

EXAMPLE I

Demulsifier Tests

Results of bottle emulsion tests are summarized in the following tables. The first successful reduction to practice was Example Ib. In these tests, PEI is a 50,000–100,000 molecular weight poly(ethyleneimine); Dow XS84300 is an experimental polymeric polyalkylene polyamine of >9,000 molecular weight with total nitrogen present in the following mole ratios: 2 free amine, 2 amine hydrochloride, and 3 quaternary ammonium salt; PLURIFLOC ® C-31 is a polyalkylene polyamine of >6,000 molecular weight with 30% of the nitrogens present as amine hydrochloride and 70% as free amine; POLYOX ® WSR-301 is a 4,000,000 molecular weight poly(ethylene oxide); CORCAT ® P-12, P-18, P-200 and P-600 are commercial poly(ethyleneimines) with respective molecular weights of 1,200, 1,800, 20,000 and 60,000; Poly(vinyl amine) hydrochloride had a molecular weight of 50,000–160,000.

The adverse effect of high pH on the demulsification process is seen in Examples t, u and v.

The adverse effect of quaternary ammonium groups vs. amine salts is seen in Examples h, m and n.

The relative ineffectiveness of other polyamine salts is seen in Examples $1^1$, $j^1$, $n^1$ and $o^1$.

The poorer performance shown by relatively low molecular weight polymers is seen in Examples $k^1$, $l^1$, $p^1$ and $q^1$.

The poor effect of acid alone is seen in $m^1$ and poor action from polyamine alone is seen in a. The necessity of preforming the amine salt instead of adding amine and acid to the emulsion stepwise is demonstrated in Examples $a^1$, $b^1$ and $c^1$.

EXAMPLE II

Preparation of Quaternary Ammonium Salt of PEI

A 250 ml flask was charged with 30 g of 30% aqueous solution of 50,000–100,000 molecular weight poly(ethyleneimine) and 50 ml methanol. 40 ml (1 equivalent) dimethyl sulfate were added over 1 hour with an exotherm to 39° C. The solution was refluxed for 2½ hours under nitrogen with mechanical stirring and then cooled.

EXAMPLE III

Ft. McMurray Demulsifier Bottle Testing

The following basic testing procedure was employed.

(a) A 1% solution of each chemical was prepared in H₂O and pH optionally adjusted using concentrated hydrochloric acid.

(b) 100 ml of fresh, hot bitumen emulsion of known bitumen content obtained by in-situ steam flooding in tar sand pattern located at Ft. McMurray, Alberta, Canada was poured into a sample bottle.

(c) 50 parts (volume) of Wizard Lake crude was added as diluent to 100 parts bitumen contained in the emulsion.

(d) Chemical was added to the diluted emulsion at the following concentrations: 10, 20, 30, 50, 75 and 100 ppm.

(e) Contents of the bottles were mixed and placed in an oven at 180°–200° F. for a 24-hour period.

(f) BS&W determinations were made on the oil layer and for some systems the oil content in the water layer was estimated by the following method:

(i) A series of color standards were prepared by dissolving 750, 500, 250, 200, 150, 100, 75, 50 and 25 ppm by weight of bitumen directly in 1,1,1-trichloroethane.
(ii) 5 ml of the water layer in a sample bottle was transferred to a separatory funnel.
(iii) The water aliquot was extracted with 25 ml of 1,1,1-trichloroethane and the extract filtered to remove solids.
(iv) The extracted solvent was compared as to color with the prepared standards in identically sized vials (dilution of the extract with more solvent was used if necessary). From this comparison the original oil content of the water was estimated. With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion, and a small (sometimes non-existent) dark water layer containing particles or chunks of solid bitumen and clay. Test results are included in the table for Example III.

| | | | | | |
|---|---|---|---|---|---|
| | | DEMULSIFIER TESTING | | | |
| Example I | Candidate Demulsifier (pH of 1% aqueous soln) | Concentration, (ppm) | Oil Phase Vol. in ml (% $H_2O$) | Emulsion Phase Vol. in ml (% $H_2O$) | Aqueous Phase Appearance |
| a | PEI | 60 | 5 | 1.5 | Light muddy with deposit |
| b | PEI.HCl (6–7) | 60 | 8 | 0 | Colorless, clear |
| c | Dow XS84300 (6) | 60 | 3 | 2 | Muddy with deposit |
| d | Dow XS84300 (6) | 120 | 6.5 | 0 | Muddy with deposit |
| e | None | — | 2.5 | 1.5 | Muddy |
| f | PEI.HCl (6–7) | 60 | 7 (3.3) | 0 | Colorless, clear |
| g | POLYOX WSR-301 | 60 | 7.5 (9) | 0 | Yellow, translucent |
| h | Dow XS84300 (6) | 60 | 8.5 (41) | 0 | Light muddy |
| i | PURFLOC C-31 (9) | 60 | 4.5 | 3 | Light muddy |
| j | PURIFLOC C-31 (9) | 60 | 3.5 (20.6) | 4 | Light muddy |
| k | PURIFLOC C-31.HCl (7) | 60 | 5.5 (2.4) | 2 | Light muddy |
| l | PEI.HCl (7) | 60 | 7.5 (3.8) | 0 | Colorless, clear |
| m | Product of Example II | 60 | 1 | 5.5 | Muddy |
| n | Product of Example II | 120 | 9 (85.7) | 0 | Yellow, translucent |
| o | PEI.HCl (6.1) | 60 | 8 | 0 | Colorless, clear |
| p | PEI.HCl (5.3) | 60 | 7.5 (2.3) | 0 | Colorless, clear |
| q | PEI.HCl (3.3) | 60 | 8 (3.1) | 0 | Translucent |
| r | PEI.$H_2SO_4$ (7) | 60 | 9 (2.8) | 0 | Colorless, clear |
| s | PEI.$NaHSO_4$ (7.2) | 60 | 7.5 (3.9) | 0 | Colorless, clear |
| t | PEI.$H_3PO_4$ (8.4) | 60 | 5 (40.8) | 0 | Light, muddy |
| u | PEI.$Na_2HPO_4$ (11.6) | 60 | 3 | 4.5 | Light, muddy |
| v | PEI.$NaH_2PO_4$ (9) | 60 | 1.5 | 3.5 | Light, muddy |
| w | PEI.acetic acid (5.3) | 60 | 7 (1) | 0 | Colorless, clear |
| x | PEI.$H_3PO_4$ (7) | 60 | 7.5 (2.3) | 0 | Colorless, clear (pH 7.35) |
| y | PEI.$H_2SO_4$ (3.8) | 60 | 7.5 (1.9) | 0 | Colorless, clear (pH 6.84) |
| z | PEI.HCl (5.3) | 60 | 7.5 (1.8) | 0 | Colorless, clear (pH 7.25) |
| $a^1$ | PEI, followed by 1.0 equivalent HCl | 60 | 5 (21.8) | 0 | Muddy |
| $b^1$ | Conc. HCl, followed by 1.0 equivalent PEI | 60 | 8.5 (36.9) | 0 | Light, muddy |
| $c^1$ | Excess conc. HCl, followed by PEI | 60 | 10 (14.9) | 0 | Hazy, colorless (pH 2.4) |
| $d^1$ | CORCAT ® P-200.HCl (6.75) | 120 | 7 (1.8) | 0 | Colorless, clear |
| $e^1$ | CORCAT P-600.HCl (6.75) | 120 | 7.5 (1.6) | 0 | Colorless, clear |
| $f^1$ | POLYOX WSR-301 | 120 | 7 (95.4) | 0.5 | Brown, translucent |
| $g^1$ | None | — | 2.5 | 2.5 | Muddy |
| $h^1$ | CORCAT P-12.HCl (6.75) | 180 | 6.5 (3.2) | 0 | Brown, clear |
| $i^1$ | Poly(vinyl amine).HCl (5.35) | 60 | 10 (70.2) | 0 | Brown, translucent |
| $j^1$ | Poly(vinyl amine).HCl (5.35) | 120 | 8 (21.9) | 0 | Colorless, clear |
| $k^1$ | CORCAT P-12.HCl (6.75) | 60 | 7.5 (24.8) | 0 | Brown, translucent |
| $l^1$ | CORCAT P-12.HCl (6.75) | 120 | 11 (13.3) | 0 | Colorless, clear |
| $m^1$ | HCl | — | 2.5 | 2.5 | Muddy (pH 7) |
| $n^1$ | Poly(2-vinylpyridine).HCl(1.8) | 60 | 2.5 | 5 | Muddy |
| $o^1$ | Poly(2-vinylpyridine).HCl(1.8) | 120 | 10.5 (92.3) | 0 | Muddy |
| $p^1$ | Tetraethylenepentamine hydrochloride (5.5) | 60 | 8 (92.3) | 0 | Muddy |
| $q^1$ | Tetraethylenepentamine hydrochloride (5.5) | 120 | 7 (19) | 0 | Muddy |
| $r^1$ | CORCAT P-18.HCl (6.5) | 60 | 1.5 | 5 | Muddy |
| $s^1$ | CORCAT P-18.HCl (6.5) | 120 | 8.5 | 0 | Colorless, clear |

| Example III | Candidate Demulsifier | % Bitumen in Emulsion | % BS & W in Oil, (ppm chemical used) | TREATED EMULSION Middle Phase | Water Phase |
|---|---|---|---|---|---|
| a | PEI | 23 | 6 (15), 4.5(30) | None | Light, muddy |
| b | PEI.HCl (pH 7) | 23 | 4 (15), 6(30) | None | Clear, yellow (500–1,000 ppm oil present) |
| c | PURIFLOC C-31 | 23 | 2 (19), 2.5(37) | Wide | Light, muddy |
| d | PURIFLOC C-31. | 23 | 4 (19,37) | Variable | Cloudy (1000 ppm oil) |

-continued

| | DEMULSIFIER TESTING | | | | |
|---|---|---|---|---|---|
| | HCl (pH 7) | | | | |
| e | POLYOX WSR-301 | 23 | 17(20), 2 (50) | Moderate to small | Cloudy to muddy (1500–6250 ppm oil) |
| f | None | 23 | 15 | Very wide | Muddy with large bottom deposit |

Note:
The horizontal lines separate the runs made on the same day using identical emulsions.

I claim:

1. A process for recovering petroleum from O/W bitumen emulsions by demulsifying said emulsions by adding thereto demulsifiers comprising water soluble polyamine salts prepared by contacting poly(ethyleneimines) with organic or inorganic acids wherein the polyamine salts have a molecular weight from at least about 1,000 to the water solubility limit.

2. A process as in claim 1 wherein the water soluble polyamine salt has a molecular weight in excess of 10,000.

3. A process for recovering petroleum from O/W bitumen emulsions by demulsifying said emulsions by adding thereto demulsifiers comprising poly(ethyleneimines) prepared by polymerization of aziridine followed by slight crosslinking with epichlorohydrin and conversion to the water soluble salt form by contacting the poly(ethyleneimine) with an acid.

4. A process for recovering bitumen from a tar sand formation comprising
injecting into the tar sand a fluid containing hot water and/or steam in order to emulsify the bitumen in the tar sand,
recovering the emulsified bitumen,
demulsifying said emulsion by adding thereto demulsifiers comprising water soluble polyamine salts prepared by contacting polyamines with organic or inorganic acids wherein the polyamine salts have a molecular weight of at least 1,000,
converting the salts of the water soluble polyamines into inactive materials by adjustment of the pH of the aqueous phase of the broken emulsion,
reinjecting the aqeuous phase into a bitumen containing formation to recover additional bitumen.

* * * * *